Oct. 24, 1944. G. E. KING 2,361,212
PLANER CONTROL
Filed May 21, 1942 2 Sheets-Sheet 1

Return → ← Cut

WITNESSES:
Robert O. Baird
Wm. C. Groome

INVENTOR
George E. King.
BY
Paul E. Friedemann
ATTORNEY

Oct. 24, 1944.  G. E. KING  2,361,212
PLANER CONTROL
Filed May 21, 1942  2 Sheets-Sheet 2

WITNESSES:
Robert C. Baird
Nw. C. Groome

INVENTOR
George E. King.
BY
Paul E. Friedemann
ATTORNEY

Patented Oct. 24, 1944

2,361,212

UNITED STATES PATENT OFFICE 2,361,212

PLANER CONTROL

George E. King, Wilkinsburg, Pa., assignor to Westinghouse Electric & Manufacturing Company, East Pittsburgh, Pa., a corporation of Pennsylvania Application May 21, 1942, Serial No. 443,880

6 Claims. (Cl. 172—239)

My invention relates to electric control systems, and more particularly to variable voltage control systems for reversible direct current motors operating reciprocating devices.

One broad object of my invention is to increase the number of reversals per time that may be effected by a reversible motor.

Other objects and advantages will become more apparent from a study of the following specification and the accompanying drawings, in which.

Figure 1:
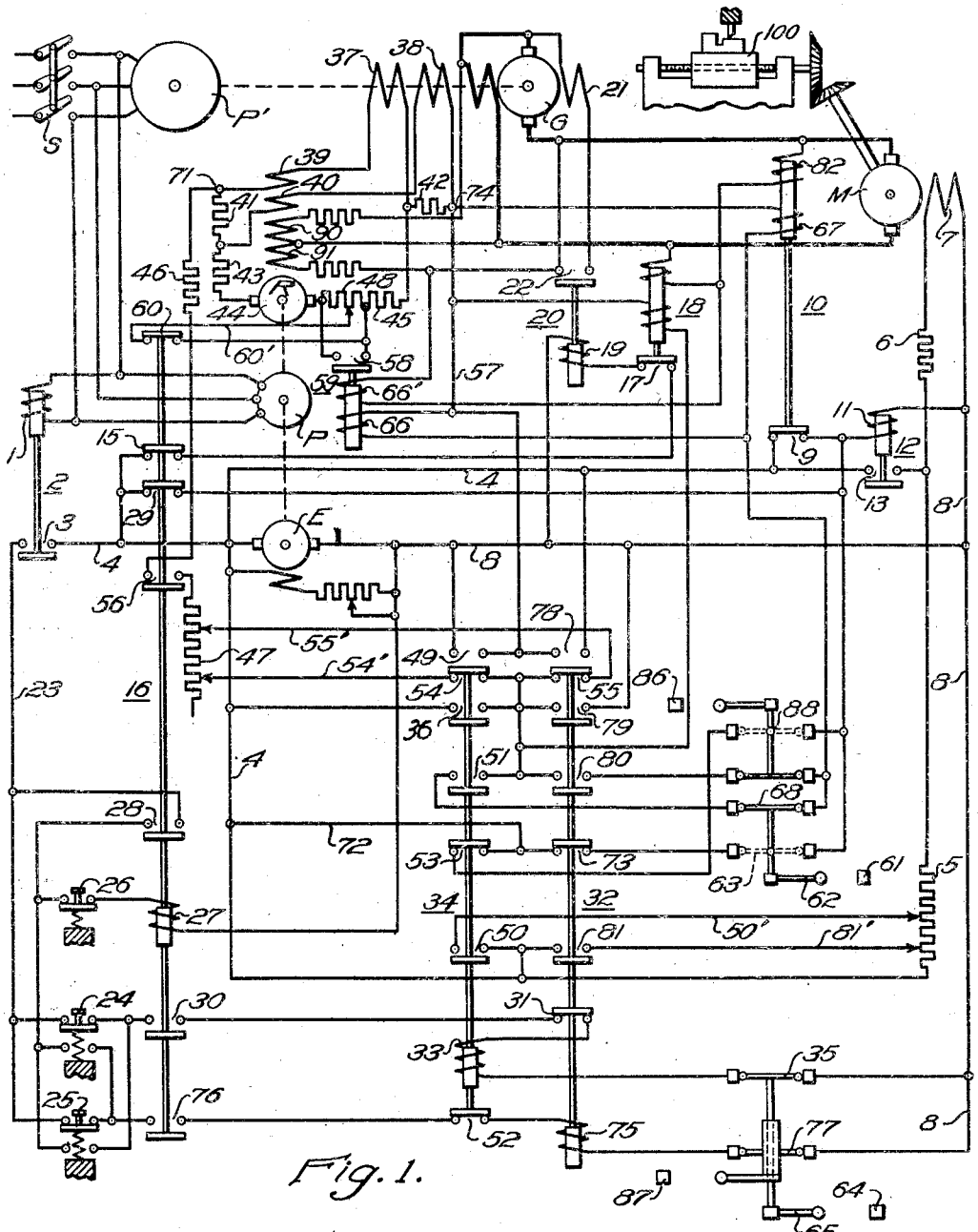
Figure 1 is a diagrammatic representation of a system of control for a reversible motor operating a planer platen or other tool actuating machine.
Figure 2:
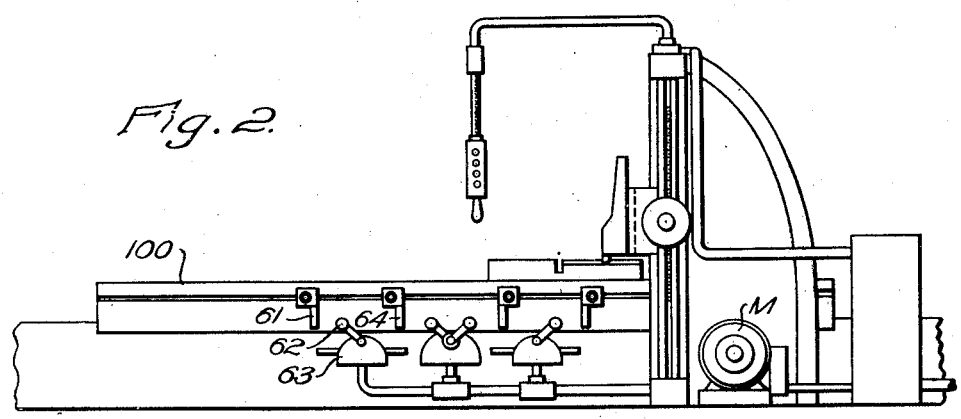
Fig. 2 is a side view, somewhat diagrammatic, of a planer having a tool support and having a motor for operating the platen.

In the practice of my invention I provide a variable voltage control in which the motor M is mechanically coupled to drive a machine tool as a planer platen 100. The motor M is provided with a separately excited field winding 7 which is arranged to be energized in a single direction only. A generator G is provided having its armature substantially directly connected to the armature of the motor M. The control of the speed and acceleration of the motor and in consequence the planer platen and the direction of movement of the planer platen is effected by varying the amount and direction of excitation of the field windings 37 and 38 of the main generator. This control may be effected in a few steps, or in many steps, depending upon the type of operation desired.

In order to maintain the speed of the motor M at various constant values corresponding to various settings of controller leads 54' and 55' and leads 50' and 81' used for controlling the current flowing through the main field windings 37 and 38 of the generator G and the field winding of the motor, a regulator-generator R is provided which is arranged to measure the speed and load of the motor M and the current flowing through the main field windings 37 and 38 of the main generator G. The armature 44 of the regulator-generator R is arranged so that it may be connected in series circuit relation with a permanent resistor 43, all, or part of, resistor 48, and with the generator field windings 37 and 38. The arrangement is such that the voltage generated in the armature 44, in response to the speed and load of the motor M, and the current flowing through the generator field windings 37 and 38 will cause a current to flow through the main generator field windings 37 and 38, which current will be a function of the departure of the motor speed from a predetermined value, corresponding to the particular setting of the leads 54' and 55' for the main field windings. The controller consists of a resistor 47, the two adjustable leads 54' and 55', the adjustable lead 55' being set for a predetermined cut speed and the adjustable lead 54' for a predetermined return speed of the planer platen 100.

Under certain load and operating conditions, no voltage will be generated in the armature of the regulator-generator R, since under these conditions the speed of the motor M corresponds exactly to the setting of the adjustable leads 54' and 55' of the rheostat 47. For all other conditions, however, a voltage will be generated in the armature of the regulator-generator in such a direction and of such value as to cause a current to flow through the main field windings 37 and 38 of the generator G so as to operate the motor M at the desired or selected speed.

In order to measure the speed of and the load carried by motor M, the regulator-generator R is provided with a field winding 90 through which flows a portion of the current flowing from generator G to motor M. The regulator-generator R is also provided with a main field winding 91 which is connected to be responsive to the voltage applied to the motor. These two field windings, namely, 90 and 91, are wound differentially to each other so that the resulting flux is a function of the speed of the motor M as measured by the counter E. M. F. of the motor. In other words, the M. M. F. produced by the current flowing through field winding 90 is proportioned to the IR drop of the motor armature of the motor M and the M. M. F. produced by the main field winding 91 is proportional to the voltage appearing across the terminals of the armature of the motor M. Therefore, the resulting flux due to the differential relationship of the two fields. i. e., 90 and 91, is a function of the counter E. M. F. of the motor M which, in turn, is a function of the speed of and load carried by the motor M.

It is desirable that any change of voltage of the generator caused by a voltage generated in the regulator-generator armature and effecting the flow of current through the main field windings 37 and 38 of the generator G be immediately reflected in the voltage generated in the armature 44 of the regulator-generator R. Such action is desired in order to prevent hunting of the system. As soon as a voltage appears in the armature of the regulator-generator R indicating that the speed of the motor M has departed from the selected speed, a change in flow of current through the main field windings 37 and 38 of the generator G takes place in such a direction as to tend to return the speed of the motor M to normal.

If some means is not provided for immediately effecting a corresponding change in the corrective voltage generated in the armature 44 of the regulator-generator R, the resulting change in the effects of field windings of regulator-generator R in response to the corrective effect will take place too late, the speed of the motor will be changed more than desired, and hunting will result. In order to make the correction applied by the regulator-generator proportional to the departure in speed of the motor from the selected speed corresponding to the setting of controller of the main field windings 37 and 38 of the generator G, a pair of differential field windings 39 and 40 are provided in the regulator-generator. These field windings 39 and 40 are connected in series with the generator main field windings 37 and 38, respectively. Therefore, any change of current through the windings 37 and 38 is immediately reflected in the voltage which is generated in the regulator-generator R. Thus any change in the current which flows through the main field windings 37 and 38 of the generator G is immediately reflected in the voltage which is generated in the armature 44 of the regulator-generator R. It is then unnecessary to await the correction in speed of the motor M, as reflected in the change in effect produced by the series and main field windings of the regulator-generator, to correspondingly affect the voltage generated by the armature of the regulator-generator.

The differential field windings 39 and 40 of the regulator-generator R are arranged to produce an effect in the same direction as the effect produced by the series field 90, and, therefore, are differentially related to the main field winding 91 of the regulator-generator.

There is always, then, a certain relationship between the speed of and the load carried by the motor M and the corrective effect caused thereby in altering the flow of current through the main field windings 37 and 38 of the main generator G. As a result the system is free from hunting and the speed of the motor M is maintained at the predetermined speed corresponding to the setting of the adjustable leads 54' and 55' of the controller regardless of the many variable conditions which would otherwise affect the speed and cause it to change from the value desired.

Reciprocating machine tools are now required to have a high production capacity. To accomplish this the main generator has been designed with much faster fields than heretofore used, so that an increased rate of acceleration of the driving motor could be obtained. Using faster fields on the generator would also increase the rate of deceleration so that the current peaks on deceleration are near or above the maximum limits that the motor can commutate.

With my scheme of control I change the time constant of the variable voltage generator fields for deceleration without materially affecting their time constant for acceleration.

Figure 3:
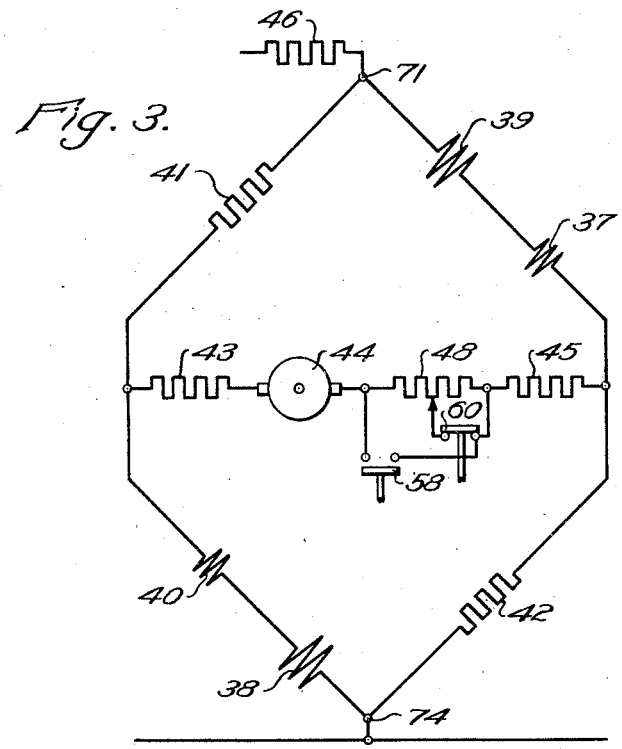
Fig. 3 is an elemental circuit diagram of that portion of my system of control separated from the machine with which it is to coact.

Fig. 3 is an elemental diagram of my control system in which I accomplish a ratio of any desired value between the rate of acceleration and deceleration of the driving motor M.

The time constant, $T_1$, for acceleration of the circuit can be expressed as $$T_1 = \frac{L}{R+R_1}$$

and for deceleration $$T_2 = \frac{L}{R+R_2}$$

where
L = inductance of the main generator fields 37 and 38 and the regulator generator fields 39 and 40;
R = resistances in the Wheatstone bridge circuit not subject to change, or adjustment; and
$R_1$ and $R_2$ = respectively, the resistances of those portions of the circuits that are subject to change, from the control, for acceleration and deceleration.

Then $$\frac{T_2}{T_1} = \frac{\frac{L}{R+R_2}}{\frac{L}{R+R_1}} = \frac{R+R_1}{R+R_2}$$

Therefore, a proper choice of the value of $R_2$ will result in a time constant $T_2$ that may be made materially higher than has heretofore been possible to obtain. This means that more rapid reversals can be obtained, that is, by adjusting the discharge resistance for the main generator field windings without affecting the time constants of the fields for acceleration, I make it possible to use much faster fields for acceleration and still obtain a smooth stop, within the commutation limits of the machines.

With my scheme, as will appear more clearly from the description given hereinafter, the regulator generator R is connected back in the circuit immediately after the planer motor reaches zero speed which helps to increase the rate of acceleration and prevents a momentary slowdown if the tool enters the work before the reversing limit switches are reset.

A thorough understanding of my contribution to the art can very likely be had from a study of the details of a typical operating cycle.

If the operator wishes to start the equipment, he actuates the motor starter S to thus cause the operation of the prime movers P and P'. The main generator G, the regulator-generator R, and the exciter E are thus caused to operate. Operation of the motor starter S also establishes an energizing circuit for the coil 1 of the relay 2, whereupon the contact members 3 of relay 2 set up circuit connections to be hereinafter described.

When the motor P is up to full speed, the voltage of exciter E will be of full value, and, in consequence, the motor M may be started. Since the voltage of the exciter E is up to normal, a predetermined direct-current potential is placed across buses 4 and 8.

The field winding of the motor M is connected to the exciter by a circuit that may be traced from the buses 4, through rheostat 5, a permanent resistor 6, the motor field winding 7, to the other bus 8.

Another circuit is established from bus 4 through the back contact members 9 of relay 10, through coil 11 of relay 12 to bus 8. The contact members 13 of this relay will thus be closed thereby shunting the rheostat 5 to thus produce a strong motor field. The motor thus may be started with a heavy starting torque.

Another circuit is established to energize the relay 20 from the bus 4 through the back contact members 15 of the control relay 16, the back contact members 17 of the time limit relay 18, coil 19 of the braking control relay 20, to the bus 8. The function of the braking control relay 20 is to connect a differential field 21 across the armature of the main generator G while the motor M is at a standstill so as to prevent creeping of the motor armature. The residual magnetism in the pole pieces of the main generator G will cause a voltage to be generated in the armature of the main generator G, therefore, the differential field 21 is connected across the armature of the main generator G through contact members 22 of the relay 20 whenever the motor M is at standstill. The resulting flux caused by the differential effect of the differential field 21 will be very small and, therefore, the voltage across the terminals of the armature of the main generator G will be of such a low value so as not to cause the motor M to creep.

To effect normal operation of the motor M, either the switch 24 or 25 may be operated. Let switch 25 be the automatic cut control push button and switch 24 be the automatic return push button. Assume the attendant presses the push button 25. A circuit is then immediately established from the bus 4, contact members 3, the conductor 23, the normally closed upper contacts of automatic return switch 24, the lower contacts of automatic cut switch 25, stop switch 26, coil 27 of control relay 16 to the bus 8. Operation of relay 16 establishes a holding circuit for coil 27 at contact members 28, the energizing circuit for the braking, or creep preventing, control relay 20 is interrupted at contact members 15, thus causing the opening of the circuit for field 21 at contact members 22, the contact members 29 are opened, and the contact members 30 are closed.

Closure of contact members 30 establishes a circuit from conductor 23, through switch 24, contact members 30, back contact members 31 of the return directional contactor 32, coil 33 of the cut directional contactor 34, the cut limit switch 35, to bus 8.

Operation of the cut directional contactor 34 closes the contact members 36 and 49 thus energizing the Wheatstone bridge circuit including the armature 44 of the regulator generator R, the main fields 37 and 38, the regulator generator fields 39 and 40, the resistor sections 41, 42, 43, 45 and 48. The rheostat 47 and the permanent resistor 46 are connected in circuit relation with the Wheatstone bridge.

The operation of contactor 34 also causes the closure of contact members 50 and 51 and the opening of contact members 52, 53 and 54.

The closure of contact members 50 of the directional relay 34 inserts a portion of the motor rheostat 5 in circuit with the field winding 7 of the motor M to give the motor a selected speed for a cutting operation of the planer. High torque and low cutting speed is thus assured during cutting operation.

When the Wheatstone bridge circuit is energized by the closure of contact members 36 and 49, a current flows from the bus 4 through contact member 36, contact member 55 of the directional contactor 32, lead 55', a portion of the resistor 47, contact members 56 of the relay 16, resistor 46, and thence through the Wheatstone bridge circuit, hereinbefore mentioned, the conductor 57, the contact members 49, to the bus 8. Under correct load and speed conditions of the motor M, the current through the Wheatstone bridge circuit will have two paths, one through regulator-generator field 39, main generator field 37, resistor 42, and the other through resistor 41, the regulator-generator field 40, and the main generator field 38, conductor 57.

For any variation from the desired speed in the cut direction, which speed is established by the setting of lead 55' of the rheostat 47, the regulator-generator, as has hereinbefore been explained, will produce a corrective effect to restore the motor M to its selected speed.

Neither the cutting load, the ambient temperature, the temperature of the electrical units, direction of operation, nor any other of the many factors that might otherwise affect the speed of operation of the motor M will have any material effect. The speed of the motor in the cut direction will always be determined by the position of the lead 55'.

Further, the novel arrangement of the field windings 37, 38, 39 and 40 in the Wheatstone bridge circuit and the proper selection of electrical constants of these windings and all the resistors associated with them, together with the novel arrangement of the contact members 60 of the relay 16 has increased the efficiency of all reciprocating strokes by reducing the time of changing from a predetermined speed in one direction to a predetermined speed in the opposite direction. The number of reversals per minute for long and short strokes has been appreciably increased, in comparison to the number of reversals per minute obtainable with old schemes, by employing my system of control.

As the planer platen 1 approaches the end of its cut stroke, a dog, schematically indicated as block 61 mounted on the platen 100, actuates the lever 62 of the cut slowdown limit switch 63. The coil 66 of relay 59 and the coil 67 of relay 10 are deenergized at contact members 68, upon actuation of the cut slowdown limit switch.

The coils of relay 10 are so selected that energization of both is required before this relay will pick up. This means that contact members 9 are closed immediately upon opening of switch 68. Coil 11 of relay 12 is thus energized and relay 12 immediately picks up thus placing a heavy field on motor M to thus effect rapid deceleration.

The coils 66 and 66' of relay 59 are so selected that either coil when energized can hold the relay in. This means that at the moment of the opening of switch 68 contacts 58 for the time being remain closed to thus provide a low resistance discharge circuit for the fields of the two generators G and R. After the motor has slowed down some and the voltage of the generator G has decreased to a given value coil 66' becomes sufficiently deenergized to permit relay 59 to drop out. Resistor 48 is thus placed in series with the discharge circuits of the fields of the generators G and R. Another braking peak is thus produced.

The mentioned discharge circuits for the fields of the generators G and R may be traced from junction 71 through resistors 41 and 43, armature 44, contact members 58, resistor 45, field windings 37 and 39 to junction 71 and the other circuit may be traced from junction 74 through resistors 42 and 45, contact members 58, armature 44, resistor 43, field windings 40 and 38 back to junction 74. After the voltage of generator G drops sufficiently each of these circuits is changed by including resistor 48 in the circuits by the opening of contact members 58. Thus during the deceleration for a reversing operation of the motor M, circuits are provded for controlled dissipation of the braking current peaks in the main generator fields 37 and 38 and the regulator-generator fields 39 and 40.

A short time after switch 68 is opened by dog 61, dog 64 actuates lever 65 of the cut limit switch to open contact members 35. This causes directional contactor 34 to drop out.

Operation of the limit switch 63 causes the coil 11 of the field weakening relay to become again energized. The circuit for this coil 11 may be traced from the bus 4 through the conductor 72, contact members 73, limit switch 63, coil 11 to the bus 8. The function of relay 12 is to reduce speed of the motor M to full field speed before the directional contactor 34 opens. This is accomplished by the contact members 13 shorting the rheostat 5 out of the circuit of motor field 7.

As the planer platen moves a short distance farther and the dog 64 actuates the cut limit switch 35 deenergizing the coil 33 of the directional contact 34 and by the closing of contact members 52 energizing the coil 75 of the directional relay 32. The circuit for energizing coil 75 may be traced from conductor 23, automatic cut switch 25, contact members 76 of relay 16, contact members 52, return limit switch contact member 77 to the bus 8. Contact members 78, 79, 80 and 81 are now closed.

Closure of the contact members 78 and 79 reverse the potential across the Wheatstone bridge circuit so as to reverse the polarity of the generator G while closure of the back contact members 54 inserts a greater portion of the rheostat 47. Also, upon closure of contact members 78, the relay 39 is reenergized, contact members 56 again short the resistor 48. Closure of contact members 81 short a portion of the motor field rheostat 5 to give the motor M a high return speed.

Opening of the field discharge path for the generator and regulator-generator fields and reestablishing the armature lower resistance circuit of the regulator-generator provides field forcing during the period of acceleration to full return speed. Contact members 9 establish an energizing circuit for the coil 11 of the field weakening relay 12. Closure of contact members 13 puts full field on the motor M, thus giving the motor high starting torque at the time of reacceleration. The relay 10 will operate again to open contacts 9 as soon as the voltage of the generator has built up sufficiently so that the combined action of coils 67 and 82 becomes effective. Opening of the contact members 9 thereupon deenergizes the relay 10, thereby allowing the control of the main motor field to be transferred to the motor field rheostat 5.

As the platen 100 moves in the return direction, it first resets the cut limit switch 35 and a short time later the cut slowdown limit switch to operate contact members 68. Resetting of the switch 35 reestablishes a path for energizing the coil 33 of the cut direction relay 34 as soon as the relay 32 is deenergized at the end of the return stroke.

At the end of the return stroke dogs 86 and 87 successively actuate limit switches 88 and 77. Switch 88 completes the slowdown circuit for the motor M and switch 77 opens the circuit for the return directional contactor coil 75. Contactor 32 now drops out and closes contact members 31 to energize the coil 33 and again pick up the relay 34.

To stop operation of the planer the stop push button 26 is actuated, thereby deenergizing the coil 27 of the control relay 16. Opening of the contact members 28 releases the holding circuit of the coil 27 and opening of the contact members 30 and 76 will deenergize the coil 33 and 75, whichever may be energized at the time. Relay 18 becomes deenergized only after the generator voltage is decreased a given amount and a circuit is thus established from the bus 4 through contact members 15 and 17, coil 19 of the relay 20 to the bus 8, thereby establishing the anticreep circuit hereinbefore explained. This means that the anticreep circuit is only established after the motor has slowed down considerably and thereafter aids in further more rapidly decreasing the motor speed down to zero speed. There is thus no arcing on the commutator.

It should be noted that in applying differential or suicide field 21 on the generator G, I use a voltage relay 18 instead of an inductive timing relay. With a timing relay the operation would have to be set for the maximum speed. This same time would then also be used for lower speeds. By using a voltage relay energized both from the exciter E and the generator G, the relay automatically changes its dropout point with changes of the voltage of generator G, or motor speed.

On effecting a final stopping from a high speed, contact members 60 are closed first to set up a partial circuit for discharging the fields which circuit becomes complete as soon as contact members 58 are opened. At a predetermined decrease in speed, namely when the voltage of generator G has decreased by a given amount, relay 59 drops out to open contact members 58. The resistances of the respective discharge circuits for the fields of the generators G and R are thus altered, that is, increased. The amount of the increase is determined by the adjustment of lead 60'. When the voltage of generator G drops still more relay 20, through the closure of contacts 17, closes contact members 22 to establish the anticreep circuit to further expedite the stopping of motor M.

On starting, discussed in part above, relay 16 operates considerably ahead of the time the directional contactors can pick up. This means contact members 15 are opened to thus instantly deenergize coil 19. The anticreep circuit is thus removed before any voltage of the exciter is applied to the generator fields. The fields 37 and 38 are thus not bucked by the flux that might be produced by field 21 if contact members 22 were closed. Further, by opening the contact members 22 before fields 37 and 38 are energized, the contact members 22 are not called upon to interrupt heavy currents.

The hereinbefore mentioned automatic change in dropout time of relay 18 thus effects opening of contacts 22 ahead of the closing of the directional contactors 32 or 34. This thus insures that the field 21 is always disconnected before the generator voltage builds up.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. In a system of control for controlling the excitation of a generator, in combination, a main direct current generator having an armature winding and having a pair of relatively low impedance field windings so that the excitation currents in them may be rapidly changed, said two field windings being respectively connected in two opposite legs of a normally balanced Wheatstone bridge, a direct current motor connected in series with the generator armature winding, a regulator-generator having an armature winding, a plurality of resistor sections connected in series with the regulator-generator armature windings, control means for adjusting the resistance value of one of said resistor sections to thus materially change the effective resistance value of the armature circuit of the regulator-generator, the armature circuit of said regulator-generator being connected across two opposite junctions of said Wheatstone bridge circuit, said regulator-generator having a pair of field windings one connected in one leg of the Wheatstone bridge in series with one of the low impedance main generator field windings and the other connected in the opposite leg of the Wheatstone bridge and in series with the other of the low impedance main generator field windings, a pair of bridge balancing resistors connected in the other two opposite legs of the Wheatstone bridge, a source of direct current, reversible switching means for reversibly connecting said source of direct current to the remaining two junctions of the Wheatstone bridge to reversibly excite certain of the field windings of said generators, and means responsive in part to the operation of said reversible switching means and in part to the voltage of the main direct current generator for effecting the operation of said control means to thus alter the effective resistance of the armature circuit of the regulator-generator.

2. In a system of control for controlling the excitation of a generator, in combination, a main direct current generator having an armature winding and having a pair of relatively low impedance field windings so that the excitation currents in them may be rapidly changed, said two field windings being respectively connected in two opposite legs of a normally balanced Wheatstone bridge, a direct current motor connected in series with the generator armature winding, a regulator-generator having an armature winding, a plurality of resistor sections connected in series with the regulator-generator armature windings, control means for adjusting the resistance value of one of said resistor sections to thus materially change the effective resistance value of the armature circuit of the regulator-generator, the armature circuit of said regulator-generator being connected across two opposite junctions of said Wheatstone bridge circuit, said regulator-generator having a pair of field windings connected in one leg of the Wheatstone bridge in series with one of the low impedance main generator field windings and the other connected in the opposite leg of the Wheatstone bridge and in series with the other of the low impedance main generator field windings, a pair of bridge balancing resistors connected in the other two opposite legs of the Wheatstone bridge, a source of direct current, first switching means for connecting said source of direct current to the remaining two junctions of the Wheatstone bridge to excite certain of the field windings of said generators in one sense, second switching means for connecting said source of direct current to the remaining two junctions of the Wheatstone bridge to excite certain of the field windings of said generators in an opposite sense, reversing means for alternately operating the first and the second switching means, and means responsive to the voltage of said main generator and responsive to the operation of said reversing means for effecting the operation of said control means to thus alter the effective resistance of the armature circuit of the regulator-generator.

3. A control system comprising, in combination, a Wheatstone bridge, a pair of bridge balancing resistors each connected in an opposite leg of the Wheatstone bridge, a main generator having a pair of low impedance field windings and an armature winding, a load connected in series with the armature winding, a second generator having at least two field windings and an armature winding, resistor sections in series with the armature winding of the second generator, the armature winding of the second generator and the resistor sections in series therewith being connected across two opposite junctions of the Wheatstone bridge, one low impedance field winding and a field winding of the second generator being connected in series and forming one of the remaining two legs of the Wheatstone bridge, and the other low impedance field winding and another field winding of the second generator being connected in series in the remaining leg of the Wheatstone bridge, a source of direct current connected to energize the Wheatstone bridge, reversing means for reversing the connection of the source of direct current to the Wheatstone bridge for energizing the bridge in an opposite sense, an electromagnetic contactor having a pair of operating coils which contactor is adapted to shunt portions of the resistor sections in the second generator armature circuit upon operation thereof, one of said coils being responsive to the voltage of said main generator and the other of said coils being responsive to the voltage of said source of direct current.

4. A control system comprising, in combination, a Wheatstone bridge, a pair of bridge balancing resistors each connected in an opposite leg of the Wheatstone bridge, a main generator having a pair of low impedance field windings and an armature winding, a load connected in series with the armature winding, a second generator having at least two field windings and an armature winding, resistor sections in series with the armature winding of the second generator, the armature winding of the second generator and the resistor sections in series therewith being connected across two opposite junctions of the Wheatstone bridge, one low impedance field winding and a field winding of the second generator being connected in series and forming one of the remaining two legs of the Wheatstone bridge, and the other low impedance field winding and another field winding of the second generator being connected in series in the remaining leg of the Wheatstone bridge, a source of direct-current connected to energize the Wheatstone bridge, reversing means for reversing the connection of the source of direct current to the Wheatstone bridge for energizing the bridge in an opposite sense, an electromagnetic contactor having a pair of operating coils which contactor is adapted to shunt portions of the resistor sections in the second generator armature circuit upon operation thereof, one of said coils being responsive to the voltage of said main generator and the other of said coils being reversibly energized from said source of direct current through said reversing means.

5. A control system comprising, in combination, a Wheatstone bridge circuit, a main generator having a pair of low impedance field windings and an armature winding, a load connected in series with the armature winding, a second generator having at least two field windings and an armature winding, one leg of the bridge circuit comprising a low impedance field winding and a second generator field winding connected in series, an opposite leg of the bridge circuit each comprising the other low impedance field winding and another second generator field winding, the remaining opposite legs of the bridge circuit each comprising a bridge balancing resistor, the armature winding of the second generator being connected in series with a plurality of resistor sections across two opposite junctions of the bridge circuit, a source of direct current, first switching means for connecting said source of direct current to the remaining two junctions of the bridge circuit, second switching means for connecting said source of direct current to the remaining two junctions of the bridge circuit in an opposite sense, a reversing control for alternately operating the first and the second switching means, an electromagnetic contactor having a pair of operating coils which contactor is adapted to shunt portions of the resistor sections in series with the second generator armature circuit upon operation thereof, one of said operating coils being responsive to the voltage of said main generator and the other of said operating coils being responsive to the voltage of said source of direct current.

6. A control system comprising, in combination, a Wheatstone bridge circuit, a main generator having a pair of low impedance field windings and an armature winding, a load connected in series with the armature winding, a second generator having at least two field windings and an armature winding, one leg of the bridge circuit comprising a low impedance field winding and a second generator field winding connected in series, an opposite leg of the bridge circuit comprising the other low impedance field winding and another second generator field winding, the remaining opposite legs of the bridge circuit each comprising a bridge balancing resistor, the armature winding of the second generator being connected in series with a plurality of resistor sections across two opposite junctions of the bridge circuit, a source of direct current, first switching means for connecting said source of direct current to the remaining two junctions of the bridge circuit, second switching means for connecting said source of direct current to the remaining two junctions of the bridge circuit in an opposite sense, a reversing control for alternately operating the first and the second switching means, an electromagnetic contactor having a pair of operating coils which contactor is adapted to shunt portions of the resistor sections in series with the second generator armature circuit upon operation thereof, one of said operating coils being responsive to the voltage of said main generator and the other of said operating coils being reversibly energized from said source of direct current through said first and second switching means upon operation of said reversing control.

GEORGE E. KING.